United States Patent [19]

Sucech

[11] Patent Number: 5,643,510

[45] Date of Patent: Jul. 1, 1997

[54] PRODUCING FOAMED GYPSUM BOARD USING A FOAMING AGENT BLEND

[75] Inventor: Steven W. Sucech, Lake Villa, Ill.

[73] Assignee: USG Corporation, Chicago, Ill.

[21] Appl. No.: 598,413

[22] Filed: Feb. 8, 1996

Related U.S. Application Data

[63] Continuation of Ser. No. 311,687, Sep. 23, 1994, abandoned.

[51] Int. Cl.⁶ .................................................. B01F 17/00
[52] U.S. Cl. ............................ 264/40.1; 264/42; 156/43
[58] Field of Search ...................... 264/42, 40.1; 156/39, 156/43

[56] References Cited

U.S. PATENT DOCUMENTS

| | | | |
|---|---|---|---|
| 3,454,688 | 7/1969 | Foster et al. | 264/42 |
| 3,912,528 | 10/1975 | Doan et al. | 156/43 |
| 4,057,443 | 11/1977 | Stiling et al. | 264/42 |
| 4,127,628 | 11/1978 | Uchida et al. | 264/42 |
| 4,156,615 | 5/1979 | Cukier | 156/43 |
| 4,618,370 | 10/1986 | Green et al. | 156/43 |
| 4,673,543 | 6/1987 | Akasaka et al. | 264/42 |
| 4,676,835 | 6/1987 | Green et al. | 156/39 |
| 4,678,515 | 7/1987 | Green et al. | 156/43 |
| 5,085,929 | 2/1992 | Bruce et al. | 156/39 |
| 5,158,612 | 10/1992 | Savoly et al. | 156/43 |
| 5,227,100 | 7/1993 | Koslowski et al. | 264/42 |
| 5,240,639 | 8/1993 | Diez et al. | 156/39 |

FOREIGN PATENT DOCUMENTS

| | | | |
|---|---|---|---|
| 47-51086 | 12/1972 | Japan | 156/43 |
| 53-63427 | 6/1978 | Japan | 264/42 |
| 53-28173 | 8/1978 | Japan | 264/42 |
| 6-23721 | 2/1994 | Japan | 156/43 |

*Primary Examiner*—Allan R. Kuhns
*Attorney, Agent, or Firm*—David F. Janci; John M. Lorenzen

[57] ABSTRACT

This invention is a process and foaming system for producing foamed gypsum board which permits the production and control of large foam voids in the gypsum core by adjusting the ratio of a first foaming agent and a second foaming agent. My process includes the steps of preforming a first foaming agent which forms stable foam voids in a gypsum slurry and independently preforming a second foaming agent which forms unstable foam voids in a gypsum slurry. Independently, blending the two different foaming agents is the key to controlling void size. A greater amount of the second foaming agent and a lesser amount of the first foaming agent is preferred.

12 Claims, 4 Drawing Sheets

PRODUCING FOAMED GYPSUM BOARD USING A FOAMING AGENT BLEND

This is a continuation of application Ser. No. 08/311,687 filed on Sep. 23, 1994, now abandoned.

TECHNICAL FIELD

This invention relates to producing gypsum board by blending two different foaming agents. More particularly, adjusting the ratio of foaming agents controls the size and distribution of foam voids in the board.

BACKGROUND ART

Typically, in the manufacture of gypsum board, for example a paper faced wall board as used in dry wall construction, a pregenerated foam is added to the board slurry mix. This foam is generated from a mixture of a liquid foaming agent, air and water in a suitable foam generating apparatus. The foamed gypsum slurry then is deposited upon a moving paper or other substrate supported on a long moving belt. A second substrate then is applied on top of the slurry to constitute the second face of the gypsum board. Next, the sandwich passes through a forming station which determines the width and thickness of the gypsum board. In a continuous operation, the gypsum slurry begins to set immediately after the board is formed. Subsequently, the board is dried, cut and bundled into commercially acceptable lengths.

Recent attempts to improve gypsum board by reducing its weight without reducing strength include producing numerous, small foam voids in the gypsum core. To do this, the industry typically uses a foaming agent which includes oligomers of alkyl sulfates and alkyl ether sulfates. See U.S. Pat. Nos. 5,240,639 and 5,158,612.

Another recent attempt to improve gypsum board goes in the opposite direction and creates large foam voids in the gypsum rather than small ones. See U.S. Pat. No. 5,085,929.

DISCLOSURE OF INVENTION

I have now developed a process and foaming system for producing foamed gypsum board which allows one to control the size of the foam voids by adjusting the ratio of a first foaming agent and a second foaming agent. My process includes the steps of preforming a first foaming agent which forms stable foam voids in a gypsum slurry and independently preforming a second foaming agent which forms unstable foam voids in a gypsum slurry. Carefully blending the two separate foaming agents is the key to controlling void size.

The prior art foaming agents employ a mixture of alkyl sulfates and alkyl ether sulfate oligomers. The mixtures have a set ratio of alkyl sulfate oligomers to alkyl ether sulfate oligomers with a predominant amount of the ether oligomers. The prior art processes provide little regulation of size distribution over the foaming process because the ratio of alkyl sulfate to the ether oligomers in the foaming agent is preset during the sulfonation process. The prior art does not mix two separate agents at the foam generating apparatus. They generate a set mixture during oligomer production.

For my purpose here, a relatively stable soap is defined as one developed to maximize air entrainment and minimize usage in gypsum board slurries. Prior art examples include those defined in U.S. Pat. No. 5,240,639, U.S. Pat. No. 5,158,612, U.S. Pat. No. 4,678,515, No. 4,618,370 and U.S. Pat. No. 4,156,615. Normal soap usage during processing of ½" gypsum board with an average 40 LB/cuff core density ranges from 0.2 to 0.6 pound/1000 sqft. Henkel Hyonic GIF or PFM are examples of commercially available stable soaps.

On the other hand, an unstable soap refers to a foaming agent which may produce copious volumes of foam, but becomes unstable upon contact with gypsum slurries. An example is a foaming agent represented by the formula R OSO$_3$—M+ where R is an alkyl group containing 6–20 carbon atoms and M+ is a cation. These soaps are not used alone as the foaming agent in gypsum board manufacture because of the high amounts required. Usage rates to process ½" gypsum board with an average density of 40 LB/cuff core density is greater than 1.5 LB/1000 sqft.

BEST MODE FOR CARRYING OUT THE INVENTION

Figure 1:
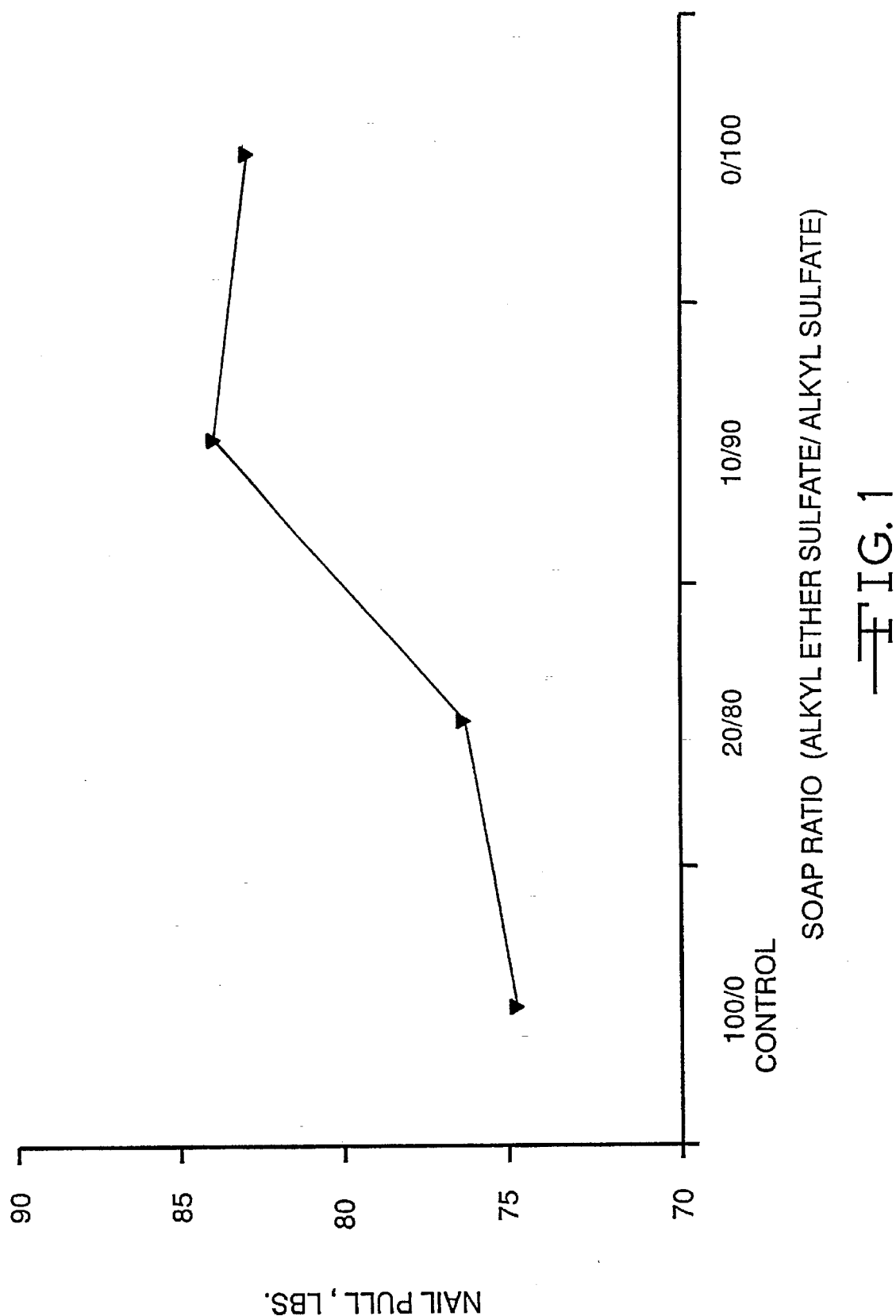
FIG. 1 is a graph of nail pull versus soap ratio.

I prefer to preform the two foaming agents or soaps prior to mixing them at the foam generator. The blending of the two agents affects foam void size in the gypsum core. One soap is a standard (stable type) board soap (i.e., alkyl chain length 8–12 carbon length and ethoxy group chain length of 1–4 units). The second (unstable) soap is an unethoxylated soap with an alkyl chain length of 6–16 carbon units. The alkyl chain can be branched or unbranched. Regulating the respective amounts of these two soap streams to the foam generator allows for control of gypsum board void structure. The ratio of the two streams is determined by adjusting soap pump settings until desired board core is obtained.

In addition to regulating the ratio of the two soaps, my invention also embraces using a predominant amount of the alkyl sulfate oligomer. This is a foaming agent which forms unstable foam voids in the gypsum slurry. The instability permits combining of foam voids and controls the production of larger foam voids in the gypsum slurry.

Actually, each of the foam generating soaps is itself a blend of oligomers. Preferably, the first soap or first foaming agent is represented by the formula:

$$CH_3(CH_2)_XCH_2(OCH_2CH_2)_YOSO_3—M+$$

wherein X ranges from 2 to 20, Y ranges from 0 to 10 with a major portion of Y being greater than 0 and M is a cation. Preferably, the second soap or second foaming agent is represented by the formula

$$R\text{-}OSO_3\text{–}M+$$

wherein R is an alkyl group containing 2 to 20 carbon atoms and M is a cation. More preferably X ranges from 4 to 16, Y ranges from 1 to 6 and R is an alkyl radical containing 4 to 16 carbon atoms. In the best mode, X ranges from 6 to 12, Y ranges from 2 to 4 and R is an alkyl radical containing 6 to 12 carbon atoms.

In both the alkyl sulfate and alkyl ether sulfate, soaps are produced having an oligomer distribution. Average values for X, Y and the number of alkyl radicals therefor are presented. For example, in the following examples X ranges from 5 to 11, Y ranges from 0–5 and the number of alkyl groups ranges from 7–9.

Either cation is selected from the group consisting of sodium, potassium, magnesium, ammonium, quaternary ammonium and mixtures thereof. Preferably, each cation is either sodium or ammonium.

The ratio by weight of the first foaming agent to the second foaming agent generally is less than 50/50. Typically, it ranges from <50/50 to 0/100. Preferably, the ratio ranges from 40/60 to 0/100. More preferably, it ranges from 40/60 to 10/90.

Independently preforming each foaming agent is a key to my control. I also prefer mixing the independent foaming agents in a foam generator prior to mixing into the slurry. Most preferably, I mix the two foaming agents just prior to feeding them into the foam generator. In another embodiment, I can feed each foaming agent separately into the foam generator.

In still another embodiment where on site control of foam void size is less critical, I can purchase the foaming agents already blended together or blend them off site in either case, according to the second aspect of my invention. In this case, the pre-blended foaming agent is represented by the formula

$CH_3(CH_2)_xCH_2(OCH_2CH_2)_yOSO_3$—M+ wherein X ranges from 2 to 20, Y ranges from 0 to 10 with at least 85 percent of Y being zero but with at least some of Y being greater than zero, and M is a cation. Preferably, 85 to 95 percent of Y is zero.

Methods and apparatus for generating foam and for making gypsum board have been well known for over 60 years. The practice of this invention uses these well known methods and apparatus. U.S. Pat. Nos. 4,518,652, 2,080,009 and 2,017,022 are just a few of the patents which describe the methods and apparatus I can use to practice my invention.

The following example further describes my process.

EXAMPLE

The following runs demonstrate the two part foaming system and its use to control the size of foam voids for gypsum board strength improvement. I blended two soaps in ratios ranging incrementally from 20/80 to 0/100 and measured the effect on board quality. The ratios are a ratio of stable soap to unstable soap. Results show average size of foam bubbles grew as ratios increased from 20/80 to 0/100. A strength increase accompanied the larger size of foam voids.

Soap usage increased with increasing ratio of unstable to stable soap. A large jump in usage occurred with the 100% unstable soap condition. A small addition of stable soap reduced usage significantly. Best results were obtained with an alkyl ether sulfate oligomer having the formula $CH_3(CH_2)_{5-11}CH_2(OCH_2CH_2)_{0-5}OSO_3Na$ and an alkyl sulfate oligomers having the formula $CH_3(CH_2)_{7-9}OSO_3Na$. The preferred ratio by weight of these two soaps was 10/90.

PROCESS CONDITIONS

In the runs of this example, the boards were produced using the following average process conditions.

| | |
| --- | --- |
| Speed | 80 ft/min |
| Stucco | 1225 lb/MSF |
| Accelerator | 11.8 lb/MSF |
| Gauging Water | 922 lb/MSF |
| Foam Water | 216 lb/MSF |
| Starch | 7.2 lb/MSF |
| Retarder | 0.92 lb/MSF |
| Dispersant | 2.73 lb/MSF |
| Cerelose | 2 lb/MSF |
| Paper Fiber | 8 lb/MSF |
| Foam Weight | 7 lb/cuft |
| Foam Air | 8 cuft/min |

The average board weight for the above runs was about 1530 lb/MSF.

TRIAL CONDITIONS AND RESULTS

Quantities of two soap streams were controlled to the foam generator using a Crane Chem/Meter 200 series diaphragm metering pump. Soaps tested were blends of stable soap or unstable soap from Henkel Corporation. Target soap ratios were 100/0 (Control), 20/80, 10/90, 0/100 stable soap to unstable soap, respectively. All soap ratios are expressed on a weight basis.

| Alkyl Ether Sulfate Oligomers | Alkyl Sulfate Oligomers |
| --- | --- |
| $CH_3(CH_2)_{5-11}CH_2(OCH_2CH_2)_{0-5}OSO_3Na$* | $CH_3(CH_2)_{7-9}OSO_3Na$ |
| Ratio By Weight | |
| I (Control) 100 | 0 |
| II 20 | 80 |
| III 10 | 90 |
| IV 0 | 100 |

*Henkel Hyonic PFM

Three board samples were taken and each board was cut into two 4'×4' samples. Analysis included nail pull. Each nail pull is an average of five punches. Nail pull increased with increasing amounts of the unstable soap component. An approximate 5 lb increase in nail pull was recorded at soap ratios with 90–100% unstable soap. Nail pull is plotted in FIG. 1.

Figure 2:
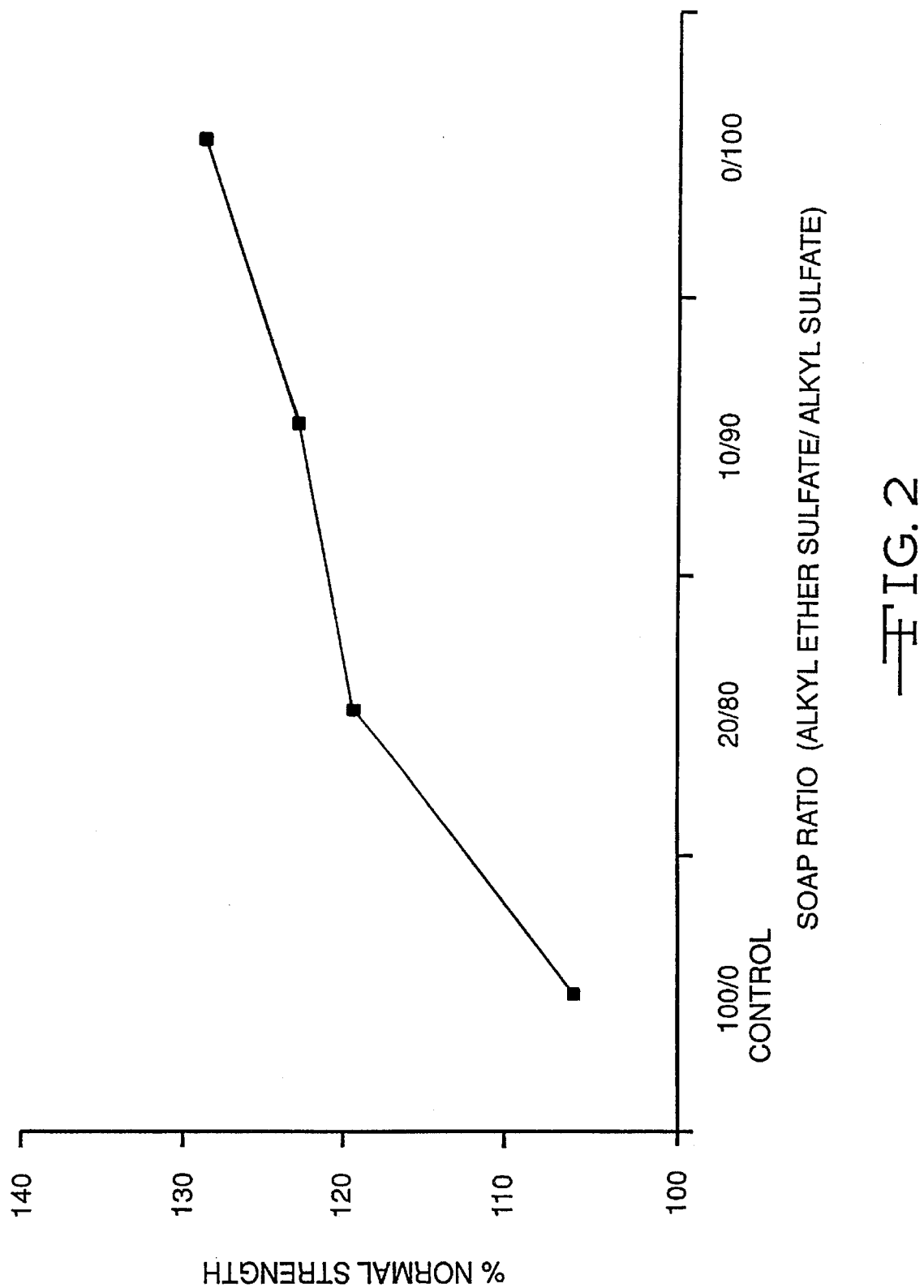
FIG. 2 is a graph of cube strength versus soap ratio.
Figure 3:
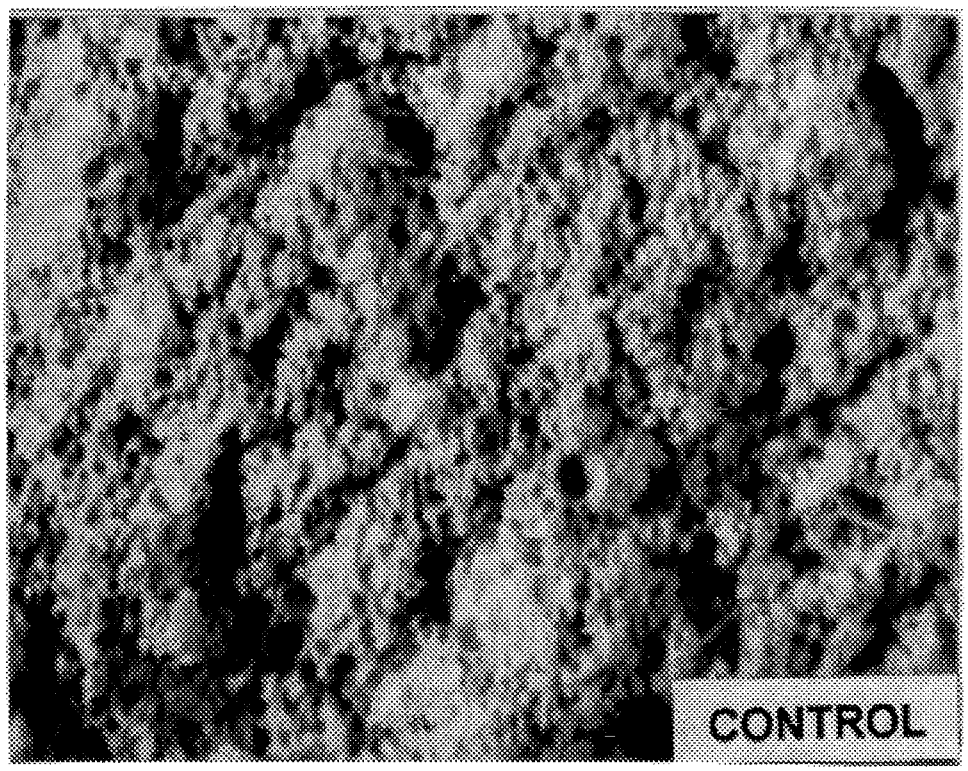
FIGS. 3, 4, 5 and 6 are photographs enlarged with 10× magnification showing foam voids in the gypsum core at different soap ratios.
Figure 4:
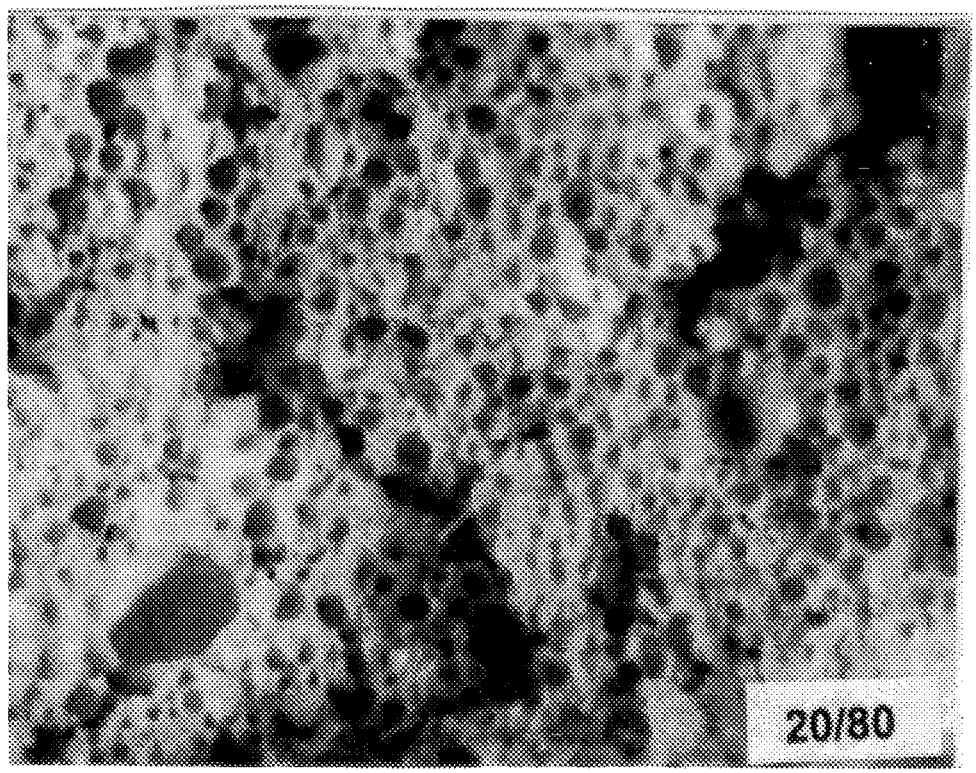
Figure 5:
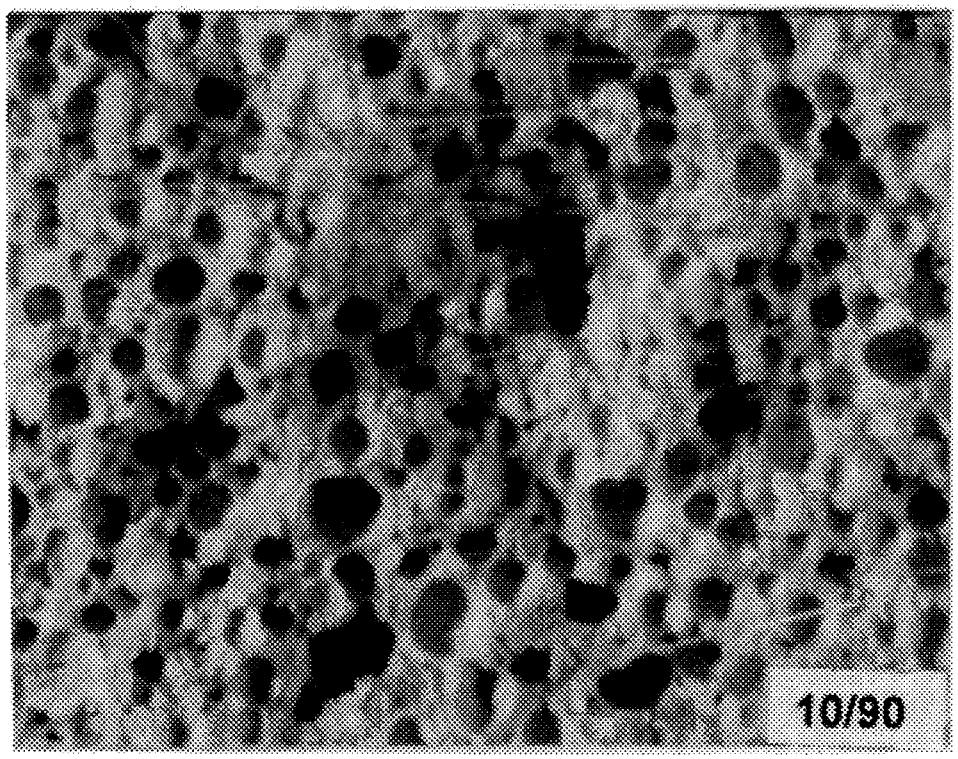
Figure 6:
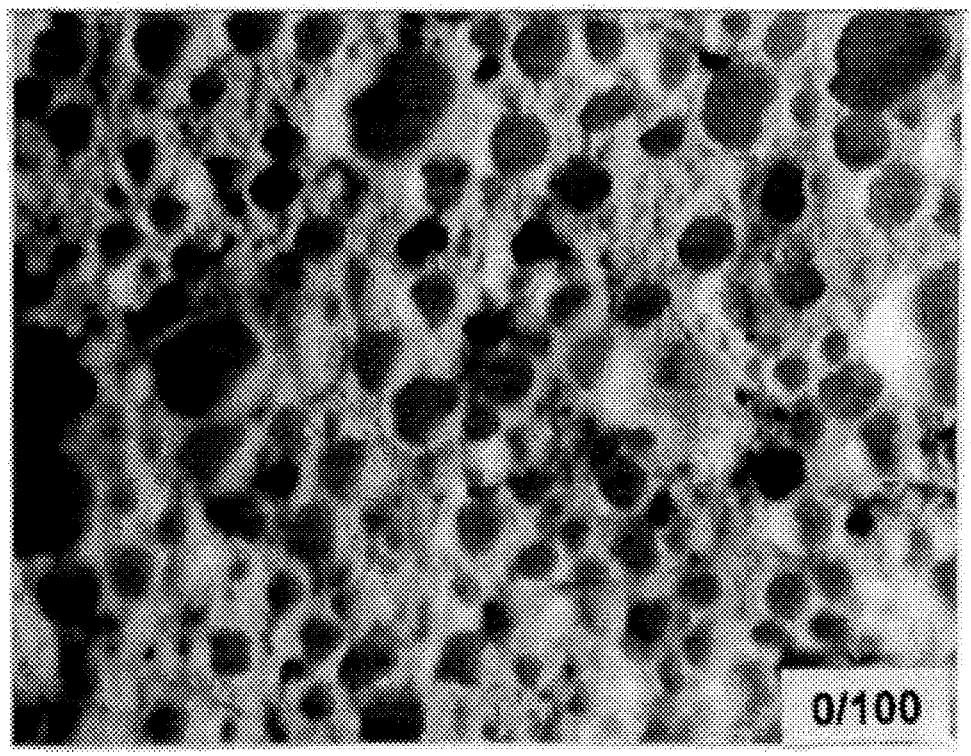

Cube strength increased in line with nail pull values. Percent normal strength versus soap ratio is graphed in FIG. 2. The combination of stable and unstable soap appears to give the best results. Soap usage increased with larger amounts of unstable soap. Between 90 and 100% unstable soap, usage increased dramatically. A small amount of stable soap appears to have a significant stabilizing affect. As larger percentages of unstable soap is added, foam bubbles in the core became larger. FIGS. 3, 4, 5 and 6 show foam voids at the different soap ratios. FIG. 3 is the control and FIGS. 4, 5 and 6 are runs II, III and IV respectively. The photos were taken at 10× magnification using a Fryer Image Analyzer with stereo microscope. Control of foam bubble size through regulation of soap ratios is clearly shown in these photos.

The size of foam voids in board core was controlled by changing the ratio of two soaps. Nail pull increased with the larger average foam cell size. Cube strength and nail pull increased as the proportion of unstable soap increased. The best results appear to be a stable soap/unstable soap ratio of 10/90.

I claim:

1. A process for producing foamed gypsum board which comprises the steps of:

providing an aqueous gypsum slurry;

providing a stream of a preformed first foaming agent which forms stable voids in a gypsum slurry;

providing a stream of a preformed second foaming agent which forms unstable voids in a gypsum slurry;

pumping and blending the streams of the first foaming agent and the second foaming agent together to form a blended stream of the foaming agents having a greater amount by weight of the second foaming agent and a lesser amount by weight of the first foaming agent;

mixing the blended stream of foaming agents with the gypsum slurry to produce a foamed gypsum core wherein the mixing produces a multiplicity of large voids substantially uniformly distributed throughout the foamed gypsum core; and controlling the production of the large voids by adjusting pump settings to adjust the weight ratio of the first foaming agent to the second foaming agent until desired board core is obtained.

2. A process according to claim 1 wherein the ratio ranges from 40/60 to 0/100.

3. A process according to claim 1 wherein the ratio ranges from 40/60 to 10/90.

4. A process according to claim 1 wherein the ratio is 20/80.

5. A process according to claim 1 wherein the ratio is 10/90.

6. A process according to claim 1 wherein the first foaming agent is represented by the formula $$CH_3(CH_2)_X CH_2(OCH_2CH_2)_Y OSO_3{-}M+$$

wherein X ranges from 2 to 20, Y ranges from 0 to 10 with Y being greater than 0 in a major portion by weight of the first foaming agent and M is a cation and the second foaming agent is represented by the formula $$R\ OSO_3{-}M+$$

wherein R is an alkyl group containing 2 to 20 carbon atoms and M is a cation.

7. A process according to claim 6 wherein X ranges from 4 to 16, Y ranges from 1 to 6 and R contains 4 to 16 carbon atoms.

8. A process according to claim 6 wherein X ranges from 6 to 12, Y ranges from 2 to 4 and R contains 6 to 12 carbon atoms.

9. A process according to claim 6 wherein either cation is selected from the group consisting of sodium, potassium, magnesium, ammonium, quaternary ammonium and mixtures thereof.

10. A process according to claim 6 wherein either cation is sodium or ammonium.

11. A process according to claim 1 wherein the first foaming agent is a blend of alkyl ether sulfate oligomers and alkyl sulfate oligomers and the second foaming agent is an alkyl sulfate or a blend of alkyl sulfate oligomers and the weight ratio of the first foaming agent to the second foaming agent is 10/90.

12. A process according to claim 11 wherein the alkyl ether sulfate oligomers are $CH_3(CH_2)_{5-11}CH_2(OCH_2CH_2)_{0-5}OSO_3Na$ and the alkyl sulfate oligomers are $CH_3(CH_2)_{7-9}OSO_3Na$.

* * * * *